United States Patent
Bate et al.

(10) Patent No.: US 7,076,805 B2
(45) Date of Patent: Jul. 11, 2006

(54) DIGITAL DATA SYSTEM

(76) Inventors: Matthew Bate, South Goringlee Farm Cottage Harbotlets Road, Pulborough, West Sussex, RH20 2LG (GB); Joanna Mary Connelly, South Goringlee Farm Cottage Harbolets Road, Pulborough, West Sussex, RH20 2LG (GB)

( * ) Notice: Subject to any disclaimer, the term of this patent is extended or adjusted under 35 U.S.C. 154(b) by 793 days.

(21) Appl. No.: 10/042,146

(22) Filed: Jan. 11, 2002

(65) Prior Publication Data

US 2002/0144155 A1    Oct. 3, 2002

(30) Foreign Application Priority Data

Jan. 11, 2002  (GB) .................................. 0100753.3

(51) Int. Cl.
*H04L 9/00*   (2006.01)
*H04L 9/32*   (2006.01)

(52) U.S. Cl. ........................... 726/31; 726/26; 713/193

(58) Field of Classification Search ................ 713/201; 726/31

See application file for complete search history.

(56) References Cited

U.S. PATENT DOCUMENTS 5,864,854 A * 1/1999 Boyle .......................... 707/10
5,999,943 A * 12/1999 Nori et al. ................ 707/104.1

OTHER PUBLICATIONS

Lotus Development Corporation, "Lotus Notes 4.5, Step by Step, A Beginner's Guide to Lotus Notes", 'Online!, (1995).
Lotus Development Corporation, "Inside Notes: The Architecture of Notes and the Domino Server", 'Online!, (2000).
Cross, B., et al., "Adding Value To A Groupware Service: BT Network for Lotus Notes", British Telecommunications Engineering, vol. 16, pp. 185-190, (1997).
"Storing and Accessing Large Amounts of Data in Lotus Notes", Research Disclosure, Kenneth Mason Publications, Hampshire, GB, p. 1143, (1999).
Borysowich, C.W., "Logus Notes and the World Wide Web—A New Partnership?", Lotus Notes FAQ, pp. 1-4, (2001).

* cited by examiner

*Primary Examiner*—Kambiz Zand
(74) *Attorney, Agent, or Firm*—DLA Piper Rudnick Gray Cary US LLP

(57) ABSTRACT

A digital data system comprising a server and a client capable of communication with one another over a network. The server includes an item store holding a plurality of data items, each data item comprising a pointer to a source data entity accessible from the network, and a component for serving copies of data items to the client. The client includes an item store for holding a copy of one or more of the data items held by the server item store and a component for requesting a copy of a data item from the server and placing it in the client item store. The client additionally includes a component for validating copies of data items held by the client item store and initiating a request for an updated copy of a data item from the server if the copy held by the item store is out of date and a user interface for enabling a user to interact with the data items to access the associated source data entities.

20 Claims, 13 Drawing Sheets

Key:
- - - - - - - - Separate Security Systems

Key:
---------- Separate Security Systems

DIGITAL DATA SYSTEM

BACKGROUND OF THE INVENTION

1. Field of the Invention

The present invention relates to a data system, in particular a system for the distribution of digital data across a communications network.

2. Background

Existing digital data systems do not provide a complete solution to the secure distribution of digital information. More specifically, there is intellectual resistance to the idea of distributing information that is confidential by way of electronic means due to the fact that closed systems such as e-mail can be unsecured by the possibility of interception and that open systems such as the world wide web are essentially broadcast systems onto which a restriction has been placed. The problems mentioned here mean that the existing systems are not trusted to deliver confidentially or report accurately.

At present, the distribution of digital data through systems related to or connected to the internet requires a collection of technologies that may or may not be designed to work in concert and all require their own security measures. An example of a fragmented system would be the publication of a confidential digital document such as a business plan or the design for an as yet unannounced product being sent from one person to another via an electronic system.

The document may reside in a database or on a computer file system. In order for the document to made available to another person, one of three methods would normally be used:

(1) Sending the document via an e-mail system;
(2) Publishing the document on a visual browsing system such as a company Intranet or the world wide web; or
(3) Placing the document on the other person's system (their virtual desktop).

These require the data to likely be handled by the following systems and in the following ways. In all cases below, the document will be encased in a computer file. A visual example of this system is given in FIG. 1.

(1) Email Protocol

In the first example, E-mail, the document is created using a proprietary application such as a word processor. This step is common in most systems where a message is complex, although it is also common to use the text editing function of the mail client application if the message is simple. The document is sent to an e-mail client application where it is placed in an electronic 'outbox' among other messages that are queued for dispatch. At the point of network connection, the messages in a time-ordered queue are dispatched over the network to an SMTP (Simple Mail Transport Protocol) server on an Internet computer that is operated by the provider of the Internet gateway on behalf of the sender of the e-mail. This provider could be the employer of the person sending the e-mail or a contracting company. The SMTP server sends the message by transmitting it across the Internet to the recipient who's address is specified in the header of the e-mail.

The message arrives in the POP3 (Post Office Protocol version 3) mailbox at the recipient's Internet service provider. On the next occasion that the recipient uses their e-mail client application to receive the messages, the POP3 box is contacted and the messages copied to the mail client. Normally these are then deleted from the POP3 mail box. The messages can then be read.

The confidentiality of the document relies on a number of unconnected security measures. First, the e-mail client contains an address book that links the commonly recognized names and links them with the e-mail addresses that they have publicized. Should the security on this program be breached, a false address could be substituted and materials intended for a specific recipient could be forwarded to a third party who may stand to gain unfairly or do harm.

When a majority of users connect to the Internet through their conventional supplier, data is sent in an unencrypted format. These formats are often open Internet standards that can be intercepted and interpreted by others. The SMTP server in this example would be considered in this light. When the file arrives in the POP3 box it is vulnerable to anyone able to gain specific user access or supervisor privileges to access the system. It is waiting to be transferred and is vulnerable at this time.

The message is then transferred to the recipient's e-mail program where in normal terms it is available to any person using that machine. It is also freely available in case of theft of the machine. It is not always the case that the message is deleted from the POP3 server when it is transferred to the e-mail program.

(2) Intranet/Web Publishing

Turning to the second example, in order to publish the data on a visual browsing system such as the world-wide web, the following steps would typically be followed.

The document containing the information would first have to be created by the appropriate tool. This tool would create a file containing the information and place it on the file system of an appropriate machine that has a permanent connection to the Internet or the network to which the recipient has access.

This computer will have installed upon it a piece of software known as a web server. The purpose of this software is to create an area of the computer that is open to public access over the network or Internet. It is through this piece of software that access controls may be implemented, it also translates the location of the file on the host computer's file system to a system more accessible from the greater network or Internet.

The location of the file should then be transmitted to the intended recipient. This would normally be done verbally or by e-mail in the case of simple one-to-one notification or by broadcast media in the case of mass transmittal.

The intended recipient would then utilize their computer by operating a piece of software called a web browser that is intended for viewing content 'served' to it by a web server that forms part of the structure of the world-wide web. The command required to view the content required is actioned by typing the provided and specific address into the appropriate section of the interface of the software. The browser then searches through whatever the standardized addressing system is appropriate for the network being accessed and returns the file to the recipients computer by calling it from the host's web server. The file is displayed to the recipient's display system and stored in a temporary cache in order to save time and possible expensive bandwidth. This cache is only active for a specified period of time, after which the file is deleted.

Transferring the file to an Internet computer is done by an open transmission system such as TCP/IP or FTP. The web server would typically have a firewall which detects unauthorized access while in contact with other computers on the Internet. Also, the computer would require an Intrusion detection system in order that unauthorized access via the Internet or other network to which the computer is connected if the confidentiality of the document was to be ensured. This system should also be aware of unofficial logins on the same site and through temporary connections including but not limited to Telnet or dial-up connections.

In cases where the web server holding the document is a cluster of computers, the maintenance of confidentiality becomes even more of a problem and an appropriate secure access control system would be needed.

By transmitting the address at which the file can be found over open networks such as e-mail or by embedding a link to the file in a web page, the possibilities of unauthorized or undesirable access increase dramatically.

When the intended recipient types the address of the file into the appropriate input area in the web browsing software of their computer, or if they click on a link to that file they are being monitored by the organization or individual supplying them with their Internet access service, giving rise to a possible breach of confidentiality. Moreover, the recipient's computer will likely have a multitude of software programs installed and neither the author of the document nor even the owner of the computer have any real control over the activities in which these software programs may participate. The user of the software rarely knows exactly how the software works, nor are they aware of the fact that most software programs are actually packages of many programs designed to do a specific job. The smaller programs within these packages are usually unknown to the user and their functionality is unclear. This requires that in order to be totally secure, the organization creating and/or distributing the file would have to control what software packages are installed on all of their intended recipients. This is impractical.

(3) File System Distribution

In the third example, assuming the creator of the file has access to the file system of the intended recipient, it would be feasible to place a copy or the original version of the file onto their system in order that the file may be opened by an appropriate editing or viewing software program. It is also possible that a computer operating system-specific 'shortcut' (essentially the network address) that would enable a single copy of the file to be accessed. This copy of the shortcut or file would be likely to be placed on the recipient's virtual desktop, a metaphor used by most visual operating systems that sets aside an area for temporary work space.

Once the document has been created using an appropriate application, it would likely be placed on the creators local computer for access in cases of no network service being available. This computer would need to have an access control system and some functionality that will identify potential users of the machine if the confidentiality of the document is to be secured.

Since the computer on which the file resides would have to be connected to a network, this network will have to have its own intrusion security and access control system.

In order for the file to be actioned by the intended recipient, they too will have to have access to a computer on the network. It is likely that this second machine will have the same security system as that being used by the author of the file. There would also be a system in place on the recipient computer that prevents unwanted programs from accessing the resources on the system. This would work regardless of the type of file being deposited as an extra precaution due to the fact that it is possible to disguise executable files that could harm the system as harmless executable or data files. It is also possible to embed executable functionality into otherwise benign data files.

When actually placing either a copy or a link to the file on the second machine, access privileges would have to be set in order to allow that to happen. The file or link would then have to be transported across the network and placed upon the recipient's system. During this time the system should be monitored for unwanted outside interventions.

Thus it can be seen that in each of the above three examples a variety of systems and security measures must be adopted in order to provide something approaching secure distribution of the document in an attempt to ensure that the document could only be accessed by those to whom access has been granted.

These numerous steps performed by disparate and open tools require security that cannot easily be controlled by a single policy, nor can it be guaranteed as safe due to the complexity involved.

Another problem facing existing data systems is the creation of multiple document copies. When a document is sent in the form of a file, it is a copy that is sent to the point of use by the recipient, a copy being retained by the originator. This is for reasons of access by the originator and in order to increase functional speed of the system by avoiding the delays caused by remote accessing.

Publishing on an Internet and intranet server can cause a duplication problem if the document needs to be edited by the recipient.

In either case, if more than one copy of a document exists and one of those copies is modified, then there exists a problem where documents that are referred to and considered as one entity are in fact multiple, unconnected entities.

With this system, serious errors are possible, even with the most refined human systems.

Another attribute of existing systems is that distributors of data have to build their own systems for access and use of the data. In particular, in order to be able to distribute data electronically to a wide audience, a full navigational interface would normally have to be designed, built and deployed on the world-wide web. This approach provokes unnecessary overheads in terms of time and money. At present there is no way to simply deploy data in an appropriate setting and have it available to a mass audience.

Moreover, end users often do not understand the method of delivery and can therefore not apply the solution to their own situation. This is because with current data systems, data can only be extracted and utilized by the use of a computer language. For instance, in the case of database systems a common language for querying data is SQL (sometimes pronounced sequel), Structured Query Language. From the web, data can be extracted, but not queried by the use of the underlying language, html or hyper text mark-up language. A more recent development of mark-up language, XML (extensible mark-up language), offers the possibility of selecting, querying and outputting data in a similar manner to SQL.

The handling and manipulation of data is achieved by scripting within pre-built applications using the languages above, however it would be necessary to build a proper application if the complexity of the solution required exceeded certain levels. These levels are generally where complex extractions that require decisions to be made by an operator or where the data has to be converted to another form before use.

The languages are complex and require a great deal of experience in the use and configuration of computer systems before they can be learned. They are specialist computer languages that do not necessarily follow natural ergonomic laws and are therefore not easily learned by those who have little technical interest. If a person wishes to create an automated system for their own use, they would have to learn some or all of the above-mentioned languages and systems and build their solution from these.

SUMMARY OF THE INVENTION

It is a general and preferred object of the present invention to provide a system for extracting data from disparate sources and distributing it by either a targeted or a broadcast method while retaining the security of the data and preferably also intellectual property rights in the data.

It is a preferred object to provide a system that enables distributed and remote access to information and data via a system that functions in a way that can be easily understood by a person with little technical understanding.

It is a further preferred object of the invention to provide a system that represents a solution to one or more or a combination of any two or more of the problems outlined above.

In one aspect the invention provides a digital data system comprising a server and a client capable of communication with one another over a network, the server including:
   an item store holding a plurality of data items, each data item comprising a pointer to a source data entity accessible from the network; and
   a component for serving copies of data items to the client; and the client including:
   an item store for holding a copy of one or more of the data items held by the server item store;
   a component for requesting a copy of a data item from the server and placing it in the client item store;
   a component for validating copies of data items held by the client item store and initiating a request for an updated copy of a data item from the server if the copy held by the item store is out of date; and
   a user interface for enabling a user to interact with the data items to access the associated source data entities.

Preferably the data system also comprises a group store holding a plurality of group identifiers, each group identifier having one or more of the data items assigned to it and a component for serving copies of group identifiers to the client. In this case, the client preferably also comprises a group store for holding a copy of one or more of the group identifiers held by the server group store, a component for requesting a copy of a group identifier from the server and placing it in the client group store and a component for validating copies of group identifiers held by the client group store and initiating a request for an updated copy of a group identifier from the server if the copy held by the group store is out of date.

At the server and/or the client, the group store may be provided by the same resource as the item store. For example, both client stores may be a common memory on a device hosting the client or on a device with persistent connection to the device hosting the client.

The server, which can be a software program, preferably enables the automation of connections to existing data sources and the importing ability that results from this functionality. The server may act as a repository for conduits or links that refer to digital data entities such as documents, sound, video and other digital objects and software that reside on a platform to which the server is connected via any type of computer network, including for example the Internet.

The client, another software program, typically connects to the server under the control of a person who is to be the end-user of the data. Preferably the client program can connect to the server via any network and can then transport linked copies of the data referenced by the server to a computer under the direct and immediate control of the end-user.

The server will typically be hosted on a device, normally a server computer, permanently connected to a communications network.

The client may advantageously be hosted on a great variety of devices, which may either be permanently or intermittently connected to the network, for example via a 'dial-up' connection (which may be wireless). Examples of devices on which the client may be hosted include personal desktop and laptop computers, PDAs (personal digital assistants), cellular telephones and digital televisions.

In preferred embodiments of the system, the client comprises a data store for holding a copy of one or more source data entities associated with one or more respective data items held by the client item store. In this case, the client preferably also comprises a component for accessing over the network the corresponding one or more original source data entities and updating the copy of any data entity held by the client data store if the original has changed.

It is desirable also to accommodate the possibility that a data entity is modified at the client side of the system. Preferably, therefore, the client comprises component for accessing and updating an original source data entity with changes made to the corresponding copy of the data entity held by the client data store.

The client preferably also includes an access-control system that allows the user to only access those items of data to which access has been granted to them either by individual or group subscription. Advantageously this access may also be controlled to restrict use of the data to specific categories of action such as editing, printing into a tangible copy or further distribution.

Accordingly, in preferred embodiments, data items in the system are each coded with a security tag indicating the identity of one or more users of the system, and the client comprises a component restricting access to a data item only to those users identified in the data item's security tag.

For additional security, the client may comprise a component that prevents a copy of a data item being placed in the client item store by a user not identified in the data item's security tag. The client may also include a component for deleting a data item from the client item store and for deleting any associated copy data entity held by the client if the client is accessed by a user not identified in the data item's security tag.

In order that data items may be conveniently organized into groups, preferably automatically, each data item preferably comprises a meta tag containing information about the source data entity to which it points. A great variety of information may be references in such meta tags, including for example categories of information, authors, source identifiers, etc. Meta tags may also be used to provided for the purposes other than grouping of the data items, for example to provide a user with summary information about a source data entity to which the item points without the user having to access the data entity itself.

Much of the functionality of the server and client software can be granted to it by means of a library of plug-in components. This library may be held in a form that means that each individual component can be either selected by preference of the end user or mandated by the supplier of the server functionality.

These components can include, for example, security functionality, which for instance may be mandatory at the request of the supplier of the data, players of music or video, or viewers of text or graphical material that the end-user desires or needs in order to experience the data.

The component library could also include the connectors that the operator of a server program would use in order to connect the server to an existing data source including, for instance connectors for databases, electronic mail systems and file systems.

The components in the component library can be distributed in the same secure manner as data is distributed in preferred embodiments of the inventive system.

DESCRIPTION OF THE FIGURES

Embodiments and preferred features of the invention are described below, by way of example, with reference to the accompanying drawings, in which.

DESCRIPTION OF EMBODIMENTS AND PREFERRED FEATURES

In the following description digital data is referred to as a data entity. In the examples below, each such entity is preferably the smallest possible meaningful piece of data; examples of this would be a telephone number, the street location of a house, a single piece of music, an instalment in a video sequence, a legal contract or a letter or message. These data entities are referenced by data items held as links on a server program. The links refer to the location of the original 'source material' somewhere on a network-connected data system.

Figure 1:
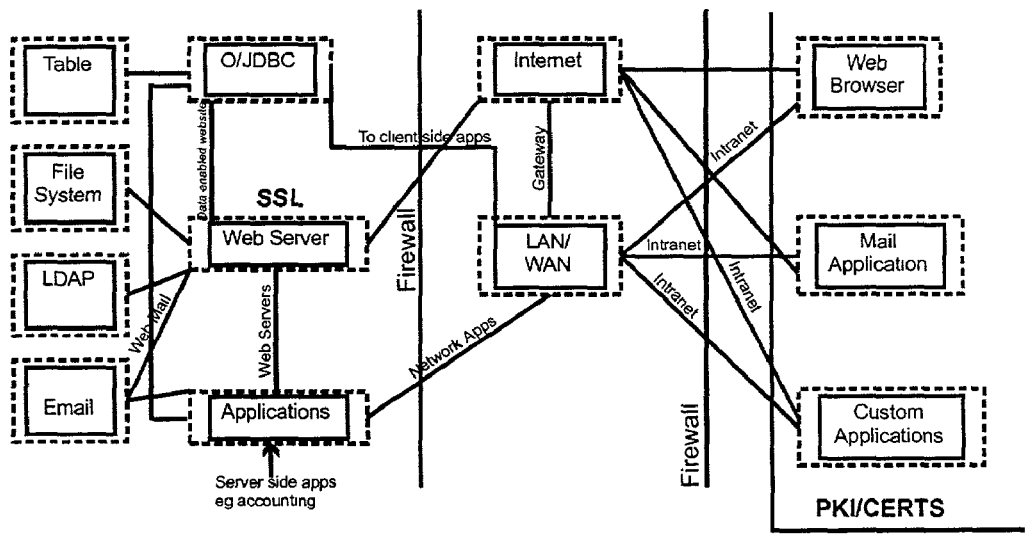
FIG. 1 is a schematic illustration of an existing data distribution system that relies on data being passed between different computer software programs connected to the same network, including an indication of the operations being carried-out by both visual browsing systems and by electronic mail systems.
Figure 2:
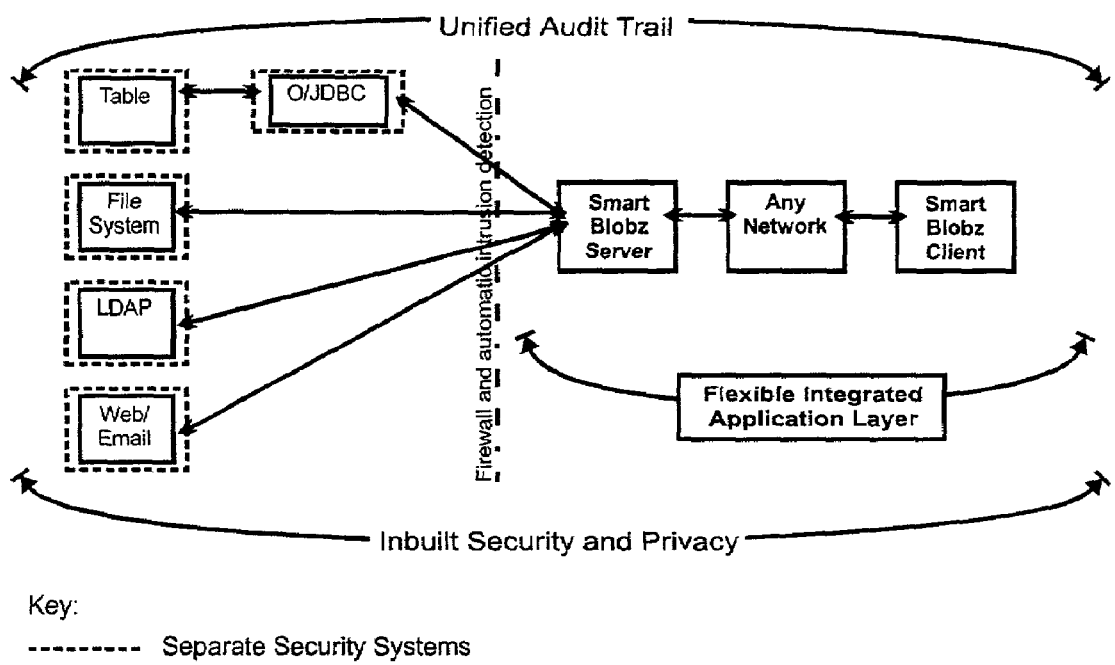
FIG. 2 is a schematic illustration of an embodiment of the system of the present invention.

FIG. 2 schematically illustrates a data system structured in accordance with an embodiment of the invention. The server program (labeled "SmartBolbz Server") communicates with a client program (labeled "SmartBlobz Client") across a communications network. Examples of network connected data systems to which the data items on the server point are shown in the figure, e.g. a table in a database, a file system, a directory system and web/email systems.

In the client program, the data items can be links in the same way as with the server program but they can also be links to a locally-held cache of data, the contents of which retains a dynamic link to the original 'source material'. In this way, a piece of data that either needs to be referenced while the local device is not connected to the Internet (for instance a mobile device) or that is too large to move across the network in the available time can be kept locally while retaining the access controls that have been set and also checking at every appropriate opportunity that it is valid and to the latest specification. This is referred to as 'intelligent caching'.

The advantage of distributing items in this way is that there is a continuous, controlled architecture between the data and the end-user. This architecture is predictable, configurable and in-line with user's requirements for networked systems. Security is implicit in the structure of the programs and requires no intervention from other applications or programs.

The business logic, legacy systems and user interface systems would make it imperative that the data objects be grouped and possibly ordered so as to provide a valid interface that in some way models the representation of data in the real world. This is achieved by the fact that all data objects are contained in one or more groups. Groups can be such disparate concepts as all data relating to the construction of aircraft, a personal system, data to be referenced from a specific device, matters concerning a meeting, pieces of music by a specific artist, messages from a person or chapters in a volume. It is important to note that an item of data can belong to any number of groups. It is also important to note that groups can be 'nested' within other groups. For instance, a message data item can be within a group that contains messages on a specific subject that is also within an individual's messages group. In this case the user would be able to decide whether to display just the messages or the sub-groups. In the latter case the messages within the sub-group would be available by 'drilling-down' to the required data by following a logical path of groups.

In an example of business logic, within an organization that runs a server program, there could be a global group that contained all the data controlled by and concerning the organization. Organizations can classify their data according to groups. For instance, one group might contain messages from an existing messaging system, another could contain contracts and another might contain accounting data from an existing accounting system. Within that organization there may also be numerous departments, each of which could be a further group. Within each department there might be numerous people, all of whom could have their own data group. Each individual would likely also have their own devices from which they would access the data, and each device could be its own group. Among this 'matrix' of people and data, any combination of information system would be possible, thus, any person would be able to access any item of data from any device providing they have both access permissions to the client program on that device and that the data is marked as being suitable for their attention. However, despite this flexibility there is still only effectively one copy of each piece of data.

The way in which this system can be presented to the user is through an 'item in a group' metaphor. One example of this would be to replicate the appearance of the conventional computer-standard 'files and folders' metaphor, whereby a picture of a folder (where the appearance is designed to model the real-life functionality of a cardboard folder, to contain documents and information) is opened by whatever means including manual input to reveal either other folders or files that contain documents or other digital information.

The system outlined here would have many advantages over the existing metaphor, which is based on transferring the directory and file structure from the computer hard disk and displaying it as a semantic 'files and folders' system that closely models a conventional filing cabinet. The system outlined here will have an almost identical user experience with the exception that the groups in the existing system are rigid, when a file or folder is placed within a folder, that is its only possible metaphoric location, it cannot also be within another. With the system outlined here, any file (data item or object) or folder (group) can be placed within any number of other folders (groups).

Thus it can be seen that by structuring a data system to include data items, which serve as pointers to source data entities (or intelligently cached copies of those entities), and groups which can represent a collection of any number of data items or groups (it being possible for each data item or group to be resident in any number of groups), a very flexible approach to the distribution of digital data is provided without sacrificing the integrity of the data.

Various other preferred features and advantages of the described system are explained below.

Security 'Tagging'

Every item of data is encoded with its own individual security information that is decoded by the client software in order for the movement and use of the data to be monitored.

An example of a method of achieving this aim would be to enclose the permissions that apply to individuals or groups in brackets. The following example would allow the individual a12mnrii30 privileges to view, edit and print the item of data and the group pvfkd45 privileges to merely view and print. The first string of letters and numbers in the string (before the first comma indicates to which individual or group the instruction applies. The following comma-separated commands indicate the status of viewing, playing or experiencing (e), modifying (m), printing (p, other codes may apply restrictions such as listing intended recipients in a legal document) and sharing (s). It is important to note that where a possible use is denied, the code is prefixed with an 'n'.

{a12mnrii30,e,m,p} {pvfkd45,e,nm,p}

In the following example, a media item is encoded with the ability for one group of individuals to experience the data indefinitely and provide time-limited versions for a limited number of others who must belong to a specific group and another group to experience the data for a limited time and provide a certain number of experiences to any others.

{jdf0e8j,e-,nm,np,s30d/j49fj49} {p30dk30,e60,nm, np,s-5x}

Group membership could be based upon the fulfilment of certain criteria such as payment, other group membership or not being a member of a specific group. Individual tags may require that the client application check that a component is present in the end-user system before allowing the data to be experienced.

Sharing allows an end-user to provide limited experiences of the data to others who are not in the security list under certain circumstances. The possibilities of allowing shares could include sharing with a specific group, not sharing to a specific group, limited number of experiences, clips (partial experiences), time limited experiences (from notification, prior to a certain date and/or time or first experience).

It should be pointed out that the language used in designing access systems is an illustration designed to show one possible system. Components can be included in the client system that allow different languages to be utilized.

Secure Deletion of Data

Figure 6:
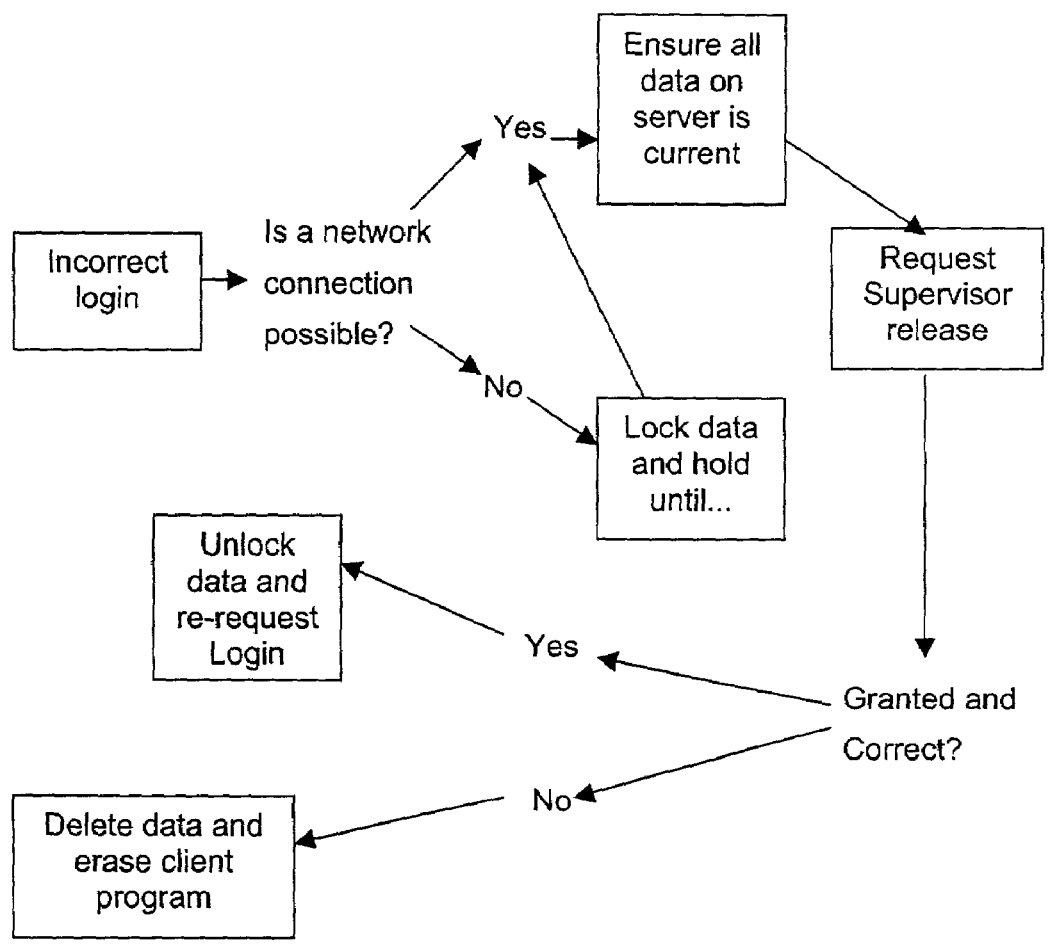
FIG. 6 is a flow illustration of the procedure involved in securing the data in the system of FIG. 2 against unwanted intrusion.

Data held on a client device can be further secured by way of a system for ensuring that data cannot be captured once a device has been misplaced or stolen. This is achieved by a combination of interactions between a server and a client device as described in FIG. 6.

Entry to the client application requires a login as defined elsewhere in this document. If that login criteria is fulfilled then access to the data on the client device is allowed. Should that login fail a pre-determined number of times then the client program will connect via the network to the server program to ensure that the server is updated with all changes made since the last network connection and make a request for a supervisor login.

If no network connection is available, then the system will be locked until the connection becomes available. In this case, a further level of encryption may be applied according to preferences of the owner of the rights of the data on the device.

A supervisor login would be initiated by the end-user wishing to gain access to the data on the device after having failed to login using their distinct system. The end-user would contact a pre-designated supervisor who would be a representative of the operator of the server at which the end-user account is stored. The supervisor would then satisfy themselves that the end-user wishing to gain access was in fact the valid user of the device and the account holder and would then issue a new login procedure while at the same time informing the device by electronic or similar means that the new login procedure is now in effect. The procedure would then re-commence.

Should the supervisor login system be inaccurate or not completed within a pre-determined time, then the data (or that which is deemed secure, to the preference of the owner of the rights to the data) would be deleted from the library of the device and the client software would un-install itself from the operating system on the device and then delete the software program. An option would be to write data in a random pattern over the empty space on the storage system of the device in order that the data could not then be retrieved by a memory utility.

A system of detecting unauthorized access by third-party programs would also trigger the deletion procedure.

'Meta' Tagging

In addition to the tagging for security reasons, data items can be tagged according to their content and be searched accordingly. This data could optionally be used to ascertain group membership and create or edit groups via automated systems.

Ergonomic Advantages

The main ergonomic advantage of the system outlined here is that is understood by the average person. By modeling what is happening in shared reality (a person is an employee of a company, a cat is a mammal and a message is from a member of a society) by placing items into groups, the system conforms to the methods of association that form the basis of human memory and creativity. A simple point-and-click system that works on the basis of 'see what it is you wish to discover and select it' can be created.

Groups can be created by end-users that are specific to tasks or areas of interest and can be for example, groups describing urgency in tasks or groups defining who will get a Christmas present. Previously this functionality would require knowledge of the workings of the products as mentioned in the Background Problems section of this document.

Advantages to a Distributor of Digital Data

The distributor of data does not have to build systems for display or security.

Display is taken care of by the reader or player residing on the client machine and is therefore an optional component.

Security is inherent in the system and any data items that are not available to the end-user will not be present for display.

Regardless of interface or access method, any attempt to break the security system by unauthorized display or unacceptable login procedure or other infraction of the procedures inherent in the software components will result in some or all of the data items being deleted from the client machine.

Advantages to the User

The user would have a much easier experience when dealing with data that is both on and off their local device.

As mentioned in the solution description above, dealing with data items on their home machine would be much easier because it would be possible to group and then experience items by association so that logical trains of thought and deed can be entered into and completed. For instance, the process of organizing a meeting would be a question of placing the data groups in a data group that represents the meeting itself. From this, invitations and joining instructions could be automated. Also, the details of the venue could be included along with any documents which may be referenced during the meeting. The automation would also normally extend to supplying the latest information to all delegates or attendees in the event of a change of plans. All of this would happen by modifying the master copy of each data item and then allowing the changes to 'ripple' across the network to include all 'intelligently' cached copies that may reside on other people's machines.

System Architecture—Overview

Figure 3:
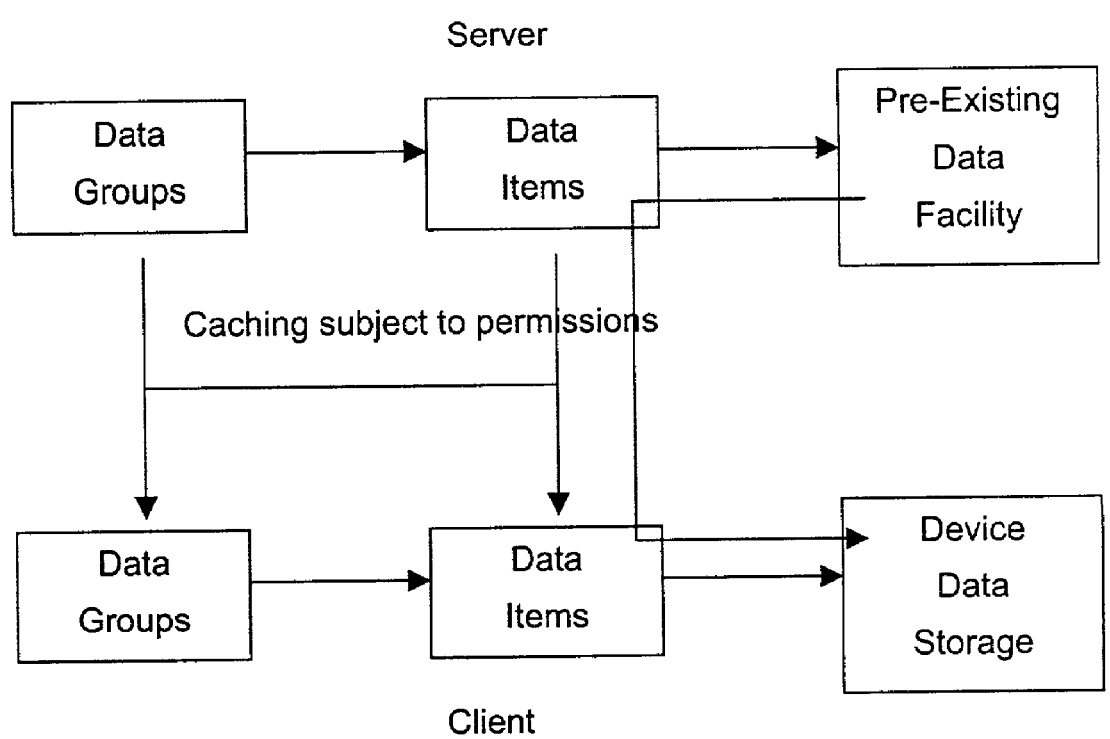
FIG. 3 is a schematic illustration of the data scheme used in the system illustrated in FIG. 2, indicating its division into libraries and distributed between the server and client software.

The system outlined here features two distinct computer software programs operating in concert. They are described in schematic and dynamic terms in the following section. In these cases, the schematic data system can be summarized by 5 the understanding of the table below and by the illustration FIG. 3. As you can see from these illustrations, there are three levels of data within the solution outlined here and these levels are replicated in whole and/or part on both the client devices and the server with the scheme on the client devices being an cache of the scheme on or accessed by the server.

|  | Groups | Items | Data |
| --- | --- | --- | --- |
| Server Program | Entries in the groups data table on or immediately available to the server program. | Entries in the items data table on or immediately available to the server that are in regard to data in the data level on or immediately available to the server program. | Existing data facility from which data is referenced, extracted and modified. |
| Client Program | Entries cached from the server program in the groups data table on the client device accessed only by the client program. | Entries cached from the server program in the items data table on the client device accessed only by the client program that are in regard to items in the data level on the client device. | Addressable entities on either the client device or on removable media in a receptacle of a format dictated by one or more optional components in component library on either client device, server program or both. Accessible only by client program excepting situations where decoding by server based component is required by access permissions. |

The Server Program

Figure 4:
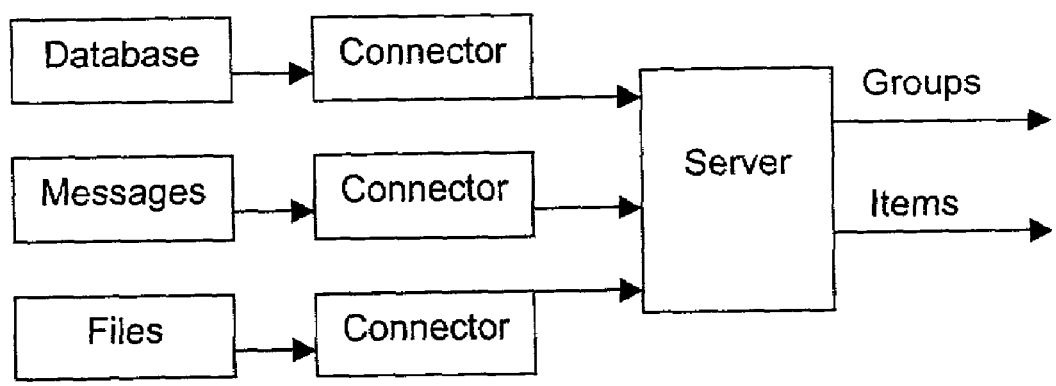
FIG. 4 is a schematic illustration of the input and output properties of the server program of the system of FIG. 2.

This program resides on a computer that is permanently connected to the network or the computer from which it is accessing, referencing and collecting data. It is very likely that this computer would be connected permanently to the Internet. See FIG. 4.

The primary responsibility of the server program is to gather data from databases, mail systems, file systems and similar repositories of digital data. The collection process is enacted through specialized connector programs that are specific to the receptacle that is holding the data. Specialized connectors could include those for Oracle, Sybase, IBM DB2 databases and specific mail servers, SMS bridges, LDAP directories and many others.

Figure 7:
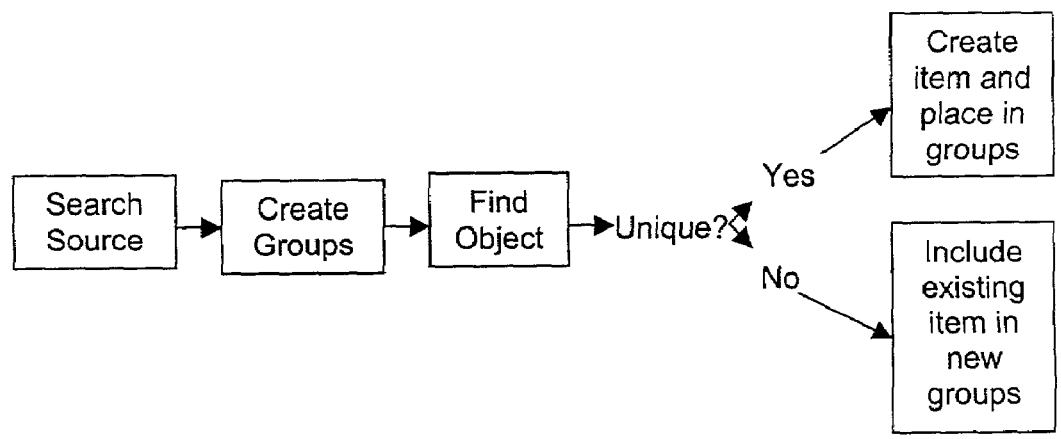
FIG. 7 is a flow illustration of the procedure involved in finding new data from any source and rendering it suitable for distribution by the system of FIG. 2.

The data is extracted through these connectors using a methodology shown in FIG. 7 and the resultant data items are stored as references in the local storage area. The storage area need not be located on the same computer as the server program but would normally be permanently available to it.

Access to the server program's resources is governed by an access control system that allows access only to client programs that have been accessed through there own login system. The server then allows the caching of data items subject to the permissions held in the security coding. Access to items and groups is controlled by a mechanism of validation (See FIG. 8.)and verification (See FIG. 9), with validation being a method of ascertaining whether permission is granted at initial contact with the data item and verification ascertains the currency of the data item.

The Client Program

Figure 5:
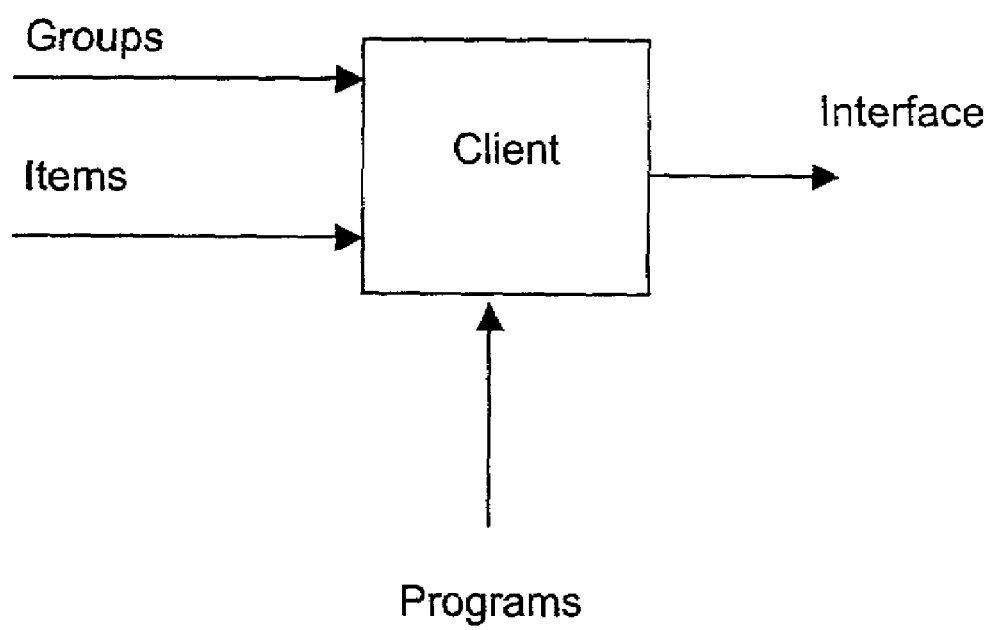
FIG. 5 is a schematic illustration of the input and output properties of the client program of the system of FIG. 2.

The client program resides on the devices, either fixed or mobile, that are operated by the end-user and form the interface between them and the data items and groups. See FIG. 5.

In order to access the client program, an initial login must take place. In most cases this would consist of a user identification and a password, either in whole or random part. The design of the client program allows for the use of biometric examination as a part of the login procedure.

Interfaces

The core functionality of the system outlined here functions irrespective of interface. The interface is a semantic metaphor that describes the metaphor inherent in the system architecture. Itemized below are three interfaces which would be part of an effective system based upon the system outline here. In all cases, the content of the interface is read from the data system under the guidance of the end-user. Where a visual metaphor is used, there will also be an un-stated but equivalent auditory and kinaesthetic equivalent.

In addition to the visual metaphor representing the data there would also be areas of input where the data items or their properties can be modified subject to permissions. These could take the form of a 'dialog box' that would be designed for the alteration of simple information such as tags or preferences or a full application such as that which created the data in the case of modifications to the data itself. The choice of which tool is associated to which type of data for the purposes of editing is decided by the settings of the operating system of the client device unless the editing preferences in the client software program dictate otherwise.

Tree Interface

The standardized interface system for the system outlined here is a metaphor similar to the files and folders metaphor utilized on most graphical interface computers.

The working area of the interface is split into two distinct areas or 'panes' placed side-by-side. In the pane to the left of the interface there is a 'tree' upon which icons representing groups listed in the groups data table on the client device or remotely accessed server are placed with their names (or an abbreviated version of their names.) When a group is activated by input from the end-user, the group grows a branch from the tree that reveals any groups that are referenced inside the open group.

The right-hand pane would also display the groups referenced inside the open group and also the items within the open group.

Figure 10:
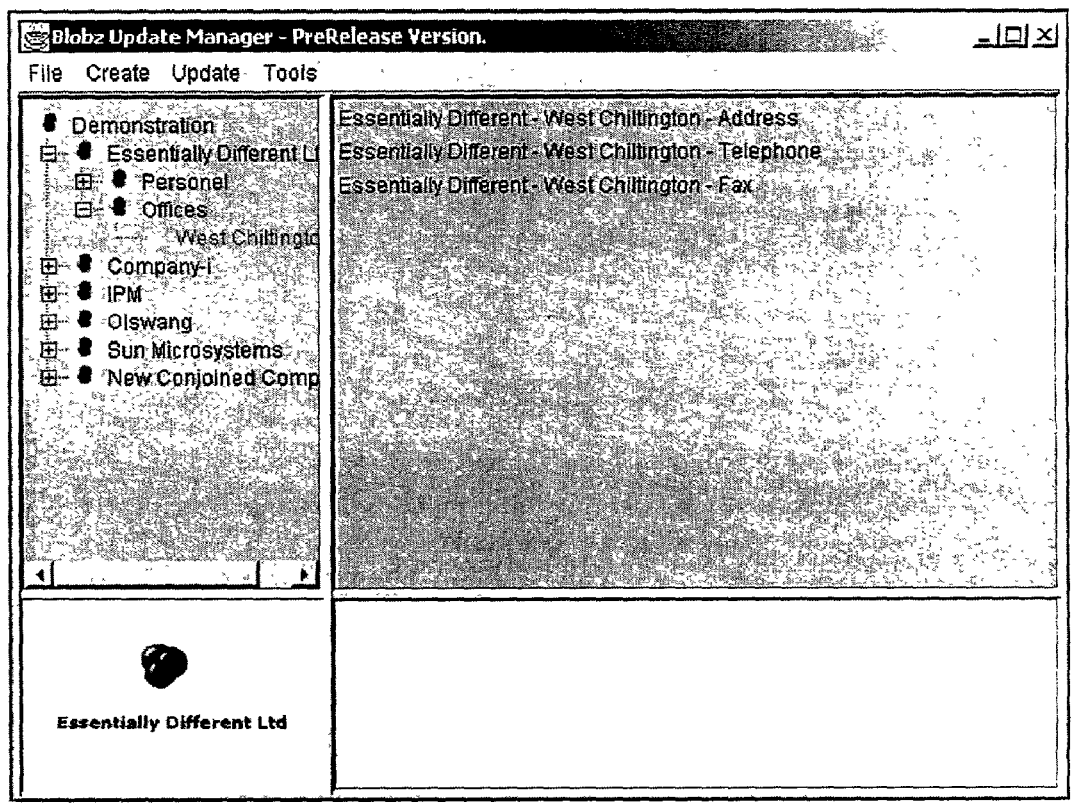
FIG. 10 is an illustration of a tree interface for use with the client program of the system of FIG. 2.

Navigation within the active group is achieved by activating the items in the right-hand pane. Navigation outside of the active group is achieved by activating other groups in the tree on the left-hand side. See FIG. 10.

Back/Open Interface

The back/open interface is identical to the right-hand pane of the tree interface, navigation within the active group is achieved by activating the items in the interface. The structure of the tree is retained in the memory of the computer but is not displayed.

Figure 11:
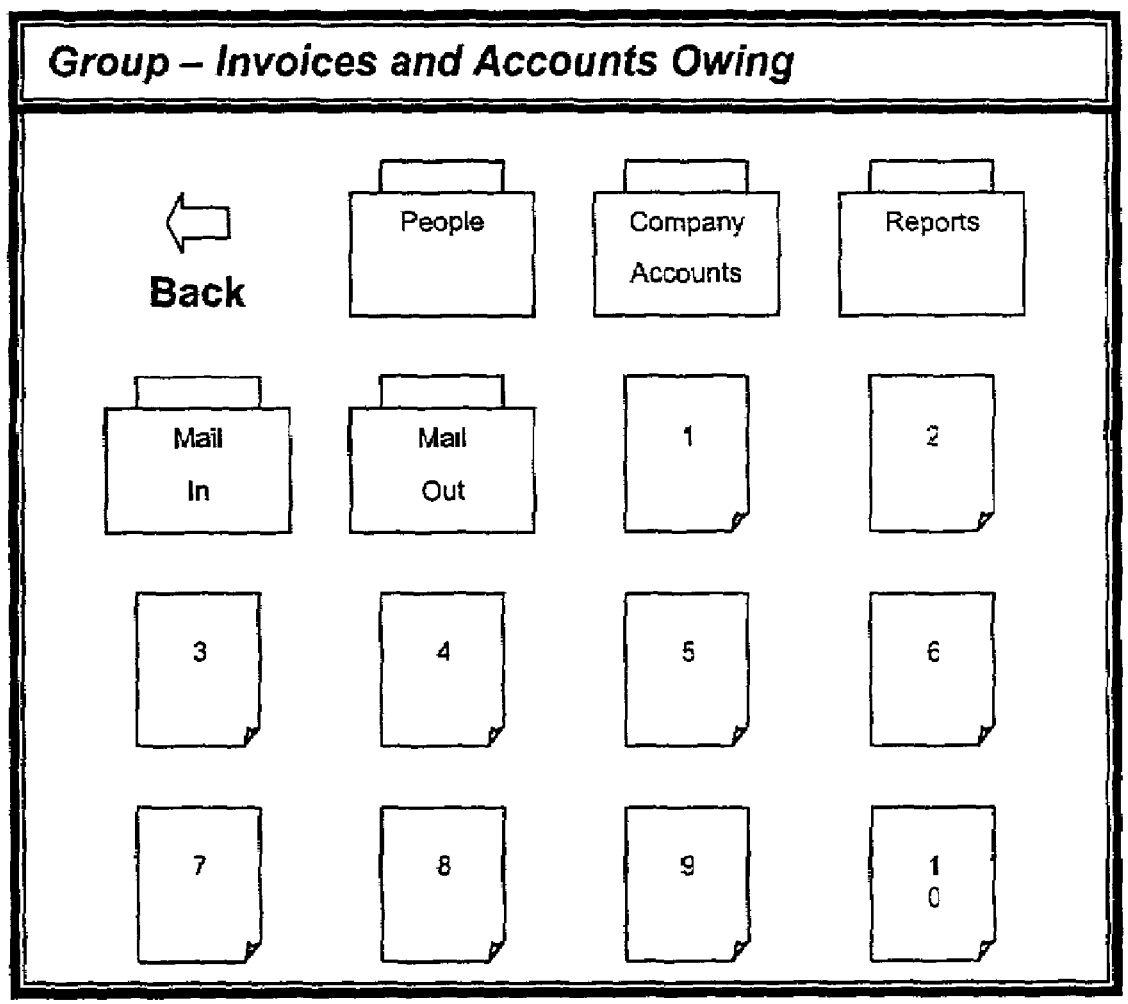
FIG. 11 is a schematic illustration of a back/open interface for use with the client program of the system of FIG. 2.

Activation of other groups or items on the system is achieved by the inclusion on or near the interface of a button or graphical device that when activated by the input from an end-user, returns the interface to the state it was in before the last end-user input, thus traveling the interface through the interface history of navigating the tree that is retained in the computer's memory. The button could appear as and be activated as if it were a group or item. The back/open interface could be an option on a system which features the tree interface with the tree being active should the operator require it or should the requested task require a selective or de-selective input from the user on the tree metaphor. See FIG. 11.

Associative Interface

The associative interface requires that two or more elements are active or 'in focus' at the same time. Both groups and items can be active in this interface. The purpose of this interface is to determine common or linking items or groups that are present in both or all selected groups or items. The groups and items listed on the interface are those listed in the groups and items databases on the local device or on a remotely accessed server.

The selection of groups or items can take place from any other type of interface by combinations of selection techniques such as keyboard/pointer co-incidences or by vocal recognition systems or other similar biometric system.

Once selected, the active groups form equally spaced graphical objects on the interface. Lines, or similar dimensional graphical devices would then be added to the interface in order to represent an item or group that is common to both elements.

It is likely that the links rendered onto the interface would be selective, possibly being limited to those in regard to a third object.

Figure 12:
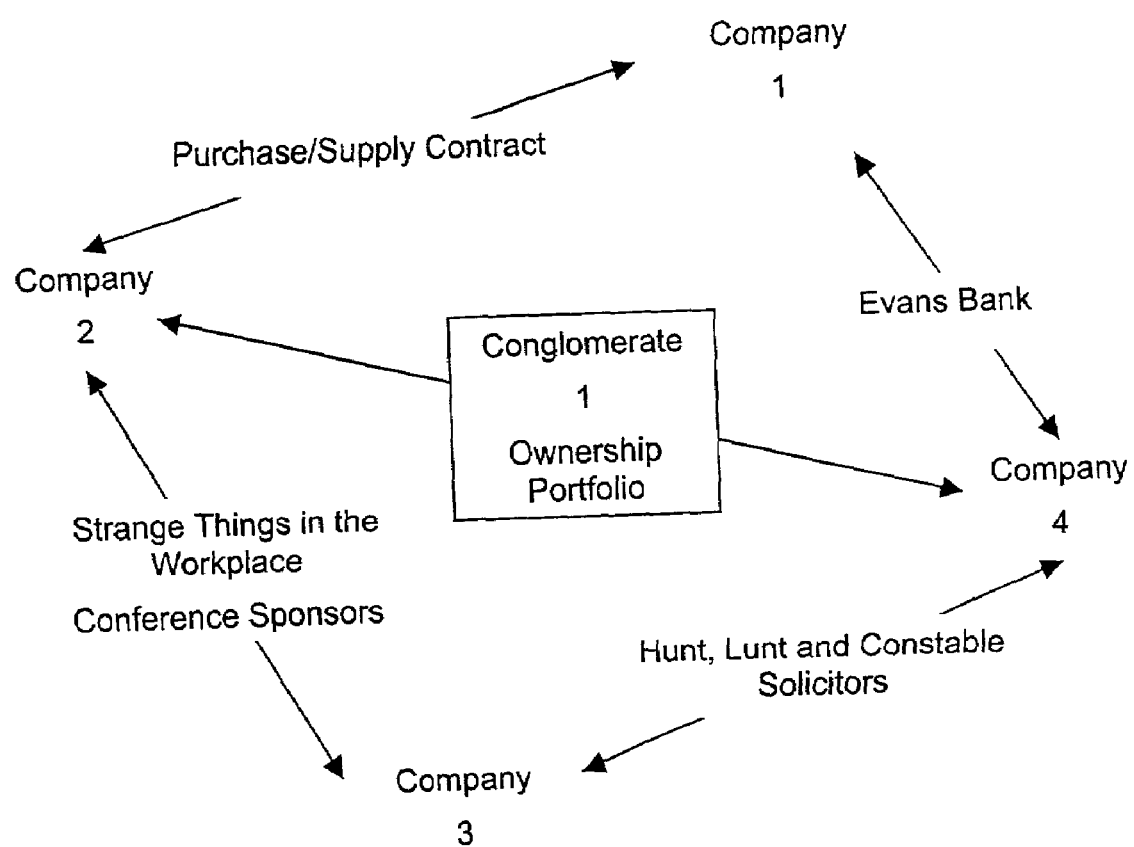
FIG. 12 is a schematic illustration of an associative interface for use with the client program of the system of FIG. 2.

This system of interface can be viewed in a two dimensional manner where it is shown with lines representing common items or groups crossing each other. It should be understood by the user that lines crossing does not imply a link other than that which might exist by the visual representation of a direct line representing a link. It would be ergonomically correct to represent this interface as either a real or synthesized three-dimensional interface whereby control inputs from the end-user or pre-programmed by the owner of the data can cause the structure representing the selected data to be rotated through any single or compound plane and allowing the structure to be viewed in an un-compromised form from any angle. See FIG. 12.

Operation of the System

The following examples of the system in use are intended to illustrate the dynamic properties of the system being described in this document.

Installing the Server Application

The system can be said to be installed upon a computer if the following criteria are met.

That the executable files of the system outlined here are either present on or available to the computer known as the server.

That the operating system of the computer known as the server has registered the presence of the server program.

Using the Server Application

The server program will have been installed with the purpose of accessing and allowing access to a specific type or types of data. The format, location and type of data will dictate the connector requirement which will be installed in the same way as the server program.

Adding 'Content' to the Server System

The basic logical methodology of adding content is identical regardless of the source of the data and visually described in FIG. 7. This logic follows the pattern of building only unique objects up to the point of their own discovery, subsequent instances being simply repeat references in the groups currently being created. This has the effect of de-duplicating the data in the data system. Specific methodologies are described below.

Creating Groups from a Library of Database Tables

Firstly, a group is created for the entire library (collection in a scheme) that is being processed in order that the project may be encapsulated. A group is then created for each library (or sub-scheme) should that scenario exist and then for each table therein and these would be referenced inside the appropriate library-extracted group.

Creating Items from a Database Table

It would be normal but not compulsory for the purposes of referencing of data to consider each table in a relational system to be rendered as a two-dimensional table. The actual method of extracting data from a relational database having methodologies specific to the actual table structure and the way in which the table is stored on the physical disk of the computer.

In the example of the two-dimensional table, this would be created in the memory of the computer as a semantic model and groups would be created for each column heading and index field, these would be referenced within the table group. The table would then be read in a logical order and each individual field would become a data item reference within all of the relevant header and index groups.

Creating Groups and Items from a Computer File System

In this example, groups would be created for each directory or folder that is found and items would be created from each file or document.

Should the format of the files being processed support file properties that are used to establish authorship, subject and other facility, then groups could also be created and the item reference be placed within.

Creating Groups and Items from a File or Document in a File System

Where a document contains text that forms a complex, multi-part document, such as that with sections delimited by headings or separated, non-contiguous pages, a group would be created from each heading, page or section with an item then being created from each element within that area such as each illustration, list, chapter, paragraph or word. This would have the advantage of being able to individually tag each item according to who has permission to view or edit each section.

The system for creating groups based upon file properties and content would apply in this case also.

Creating Groups and Items from Tagged Media

If the media files are stored (as is usually the case) on the file system of a computer, then a grouping system that models this structure would normally be created.

Many media files (such as but not exclusively) MP3 files, MPEG files and WMA files contain within them data that relates to the artist or creator of the intellectual property represented by the media, ownership, title, position within a body of intellectual property and many other criteria. Should this prove to be desirable, groups should be created that represent this information and item references be placed therein.

The ability to create groups based upon this information is not exclusive to media or binary files.

Creating Groups and Items from an E-mail Box

In this case, each mail box on each server would become a group within the server data scheme and each message would become a data item reference within the appropriate group.

Mail messages are also tagged according to (but not exclusively) sender, recipient, date/time, subject and route to recipient. This information could form the basis of a grouping/referencing system.

Creating Groups and Items from an Internet Web Site

Internet web sites are of two types; those which consist of files (documents) within directories (folders) and those where the files/folders system is supplemented, and in many cases replaced by items within a compiled database or data library.

In the case of the first scenario, the same system as per the procedure for creation of groups and items from a computer file system would be followed, with the proviso that the files/folders system presented to a server accessing from the Internet would be that presented to it by the web server with which it is communicating and would not necessarily be representative of the actual file and folder structure on the computer referred to by the web server.

The system for extracting data from complex or multi-section documents would also apply in this case, as would the system for building groups based upon file properties.

It would be the case that the documents would be referenced in there entire state, however, it may be desirable for the documents to be 'distilled' into a text-only form for distribution via networks and protocols that do not follow the display conventions of the web or its languages such as html.

Creating Groups and Items from Real-time Sources (Streaming Media and Time Servers)

Links to individual streams of broadcast, real time or other temporary media are created as data item references. The creation of groups is dependant upon the pages/sites/servers from which the links are obtained.

Automatically Creating Mixed-content Groups

The display system can be set to display either the complete list of data objects or displaying the sub-list of groups. This feature can be set to apply to a certain depth level of groups. From the list of available groups, the content and tagging of the data items and their references can be searched in order to ascertain similarities, thus, a message to a person could be included in a group along with that persons address.

Associative groups could also be found that would create groups based upon association with a third object, such as attendance at a meeting or regular contact with an entity.

Manually Creating Mixed-content Groups

The list of available data items or groups could be displayed as above and groups could be created by the use of interface components. As the interface is representative of and capable of communication instructions to change to the data in the underlying data system, this causes the data structure to be modified to reflect changes in the interface, likely interface components are not exclusively listed below;

Modern graphical and text-based computer interfaces include a virtual computer software device called a clipboard. Using this device it is possible to transport or copy groups or items from one position in the interface to another. The clipboard can be activated by the individual or combined use of the computer keyboard and mouse devices, whether virtual or actual.

With the combined or individual use of the computer keyboard and mouse devices, it would be possible to 'drag' an item of content from one place to another on the interface, either leaving the dragged item behind and untouched or deleting it from the interface depending the controls used.

Creating an End-user Account at the Server

Accounts are sub-divisions of the system that allow access to be enacted, monitored, restricted and modeled. In order for an account to be created, there must be an input of information that would differentiate that account from any other account held on the system. Accounts can be held by both people and by entities or items. If the account is held by a person, then facts about that person would be held on the system. If the account is held by an entity or item then the properties and descriptions of that entity or item would be used. In either case, this information would be used to create data items and groups which would be referenced within the account records groups held on the system. A group containing this information would also be built in order to represent this account and form the 'home group' of the data and groups to be required to be referenced by the account.

It is also a consideration that some form of consideration would have to be made in exchange for an account to be initiated and constructed. This would require that the system be informed by either electronic (or similar) or manual means that the consideration has taken place. This consideration could be deemed as being a fulfilment of the requirement for money, goods or services to have been received or otherwise changed ownership or a license to have been considered to another party.

Accounts are a container in which the responsibility for the actions, responsibilities, static or dynamic descriptions and interface devices whether virtual or real and/or temporary or permanent a referenced. An account must be created before any use of the system may be made by any party other than the installer, owner or individual charged with the responsibilities of installing monitoring and maintaining the system can take place.

The account will be given a unique identifying code that will be used in the setting of permissions when data is tagged for security purposes.

Remote Access

Once an account has been created, interfaces that represent that account can be built. These interfaces can be permanent in the case of a client device that has installed upon it a client program as described below, or temporary, such as an interface via the world-wide web or other network interface that exists only while it is being used.

Access Via Temporary Interfaces

As an example, access via the Internet would most effectively be achieved by the use of the device within a contemporary web server program known as a secure socket layer. This device, in concert with a network client application that supports the feature enables a login procedure to be completed in a secure environment and ensures that no data is retained in a temporary cache.

Once the end-user has been identified and access has been granted an interface featuring any relevant metaphor can be displayed. These interfaces are likely to be similar to the interfaces of registered client devices but would be constructed using either a network interface language such as html and derivatives or a proprietary technology such as Flash or Java.

Adding Registered Devices to the Account by Installing the Client Application on Client Devices A device can become a registered access point to the data stored or referenced by the server with which the account is being held by the installation on that device of a client software program.

The installation of the client program is identical to the installation of the server program with the proviso that the software program files must be located on the storage system that is ergonomically inseparable from the device while in use. This could happen by copying the software program from a removable or temporary source or via a network connection. Installation will be deemed to be complete when the program is present on the device and the presence of the program is registered with the operating system that controls the functionality of the device. This would enable the functionality of the software program to be accessed via the virtual and actual and the user accessible and pre-programmed interface devices of the device.

Once the software program has been installed and is functioning according to the required specification, the device must be connected to a network in order that the client software and the server software may communicate in order to establish an ordered relationship. This is know as registering the client device. Registration could be in exchange for a consideration that would be similar in scope and detail to the system for creating accounts. Once any consideration has been fulfilled, a group is created within the account group and in this group may be placed the data item references and groups that are required to be present and maintained in their most current form on the client device. The content and timing of this procedure is known as configuration.

Once the installation, registration and configuration procedures are complete, the device will be able to access the pre-requisite account and to hold cached copies of the data referenced by the server.

Using the Client Application

New objects are created by invoking the connectors concerned with the server application.

Some connectors may be present in the client device. These would normally but not exclusively be of the type that would either link a third-party application or program to the server or allow a single-use 'import' onto the server, this being likely to include a system that ensures that network use would be kept to a minimum by obviating the need for an immediate cache to the device concerned.

Experiencing an Item of Data for the First Time

Once the system of delivering and rendering or experiencing data has been established, it is now possible to interact with the system and the data residing on it or referenced by it.

Data experience methods would depend upon the system of interface in use on the device. Any interface would have methods for selecting and enacting data items, this would be vie end-user inputs through the controls of the device which are likely (although not exclusively) individual or combination inputs through a real or virtual system of buttons and a real or virtual pointer system with a visual interface.

Figure 8:
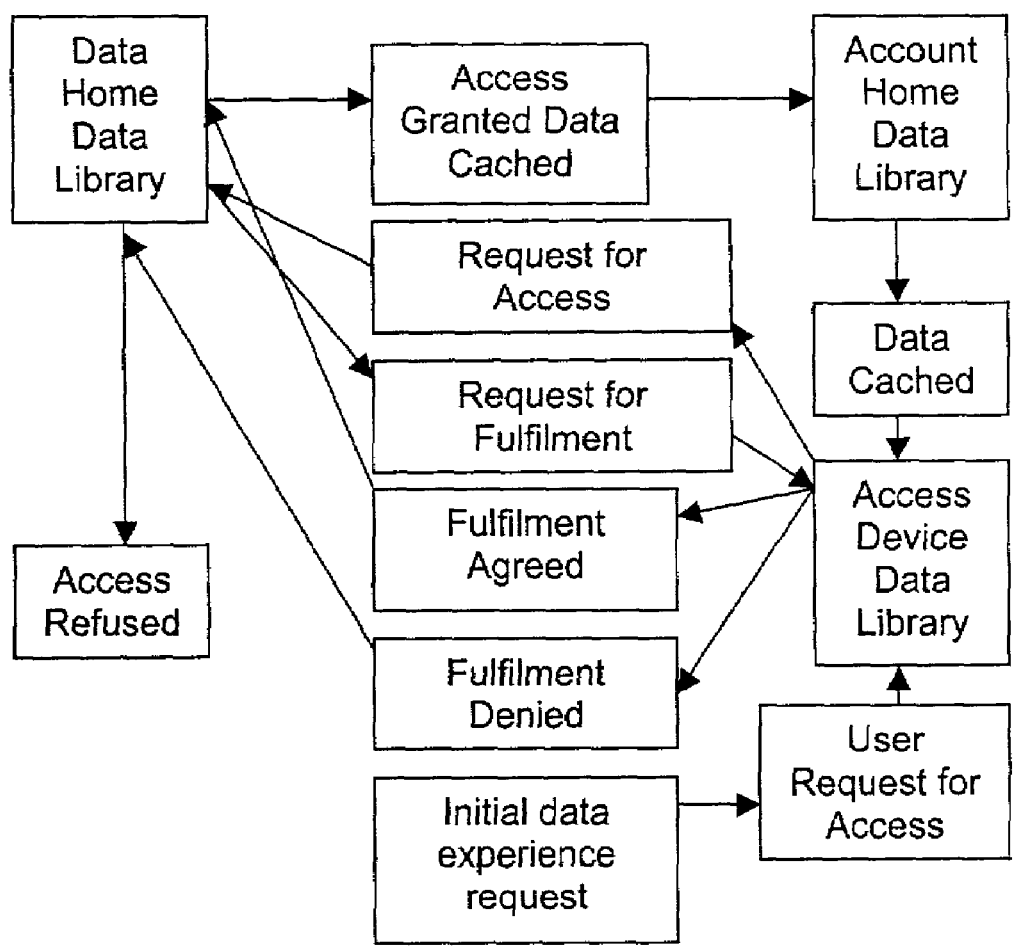
FIG. 8 is a flow illustration of the procedure of validating new data when it is first requested by the client of the system of FIG. 2.
Figure 9:
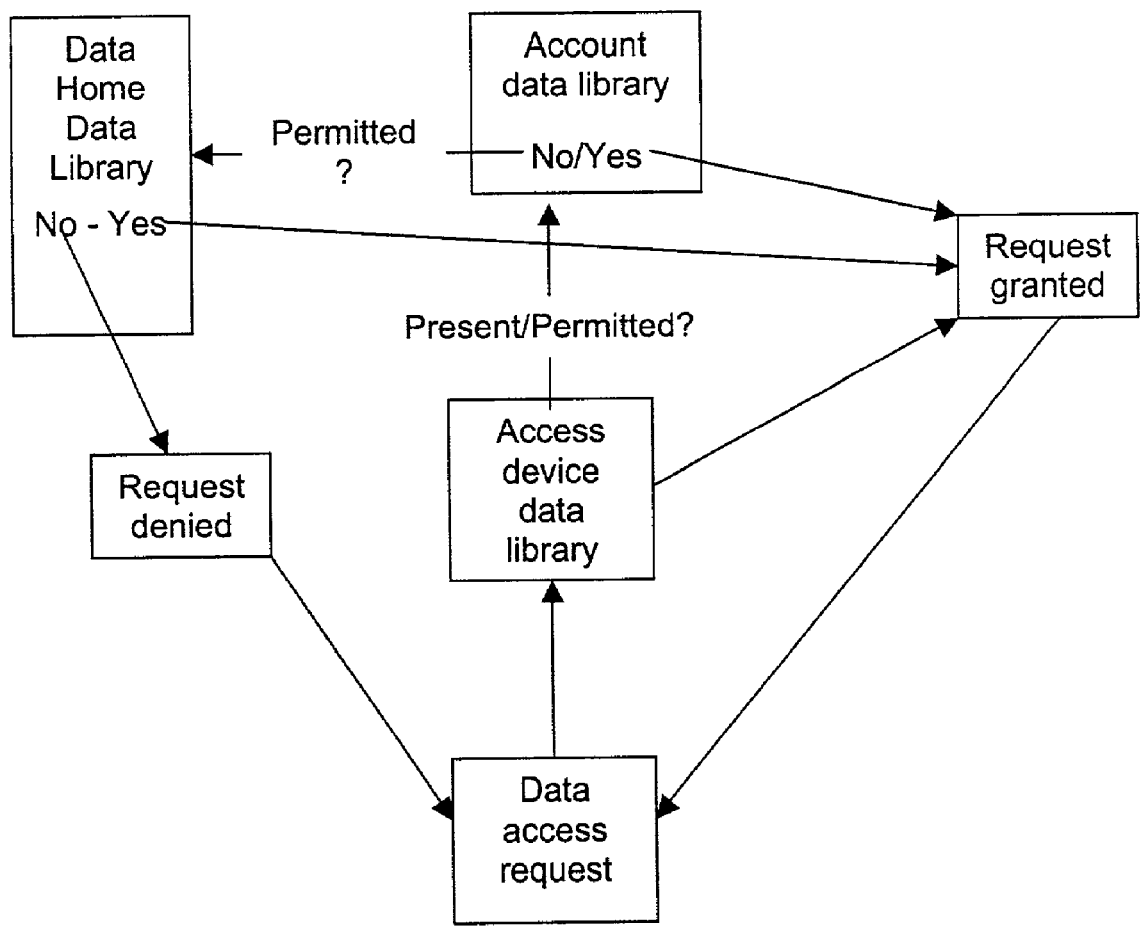
FIG. 9 is a flow illustration of the procedure of verifying data on an on-going basis to ensure that it is valid, current and suitable for the account on which it is referenced.

Once data has been enacted via the device interface or by automatic methods, the initial contact would require validation for security purposes as described in FIG. 8. The system for validating data ensures that the data has security codes that are compatible with the end-user and device codes and that all procedures including fulfilment of criteria have been completed.

This procedure would also be enacted when a data item has been 'published' to the system of the user by another user or the operator of the server as defined below.

Experiencing an Item of Data Subsequently

Depending upon the level of security selected by the owner, creator or controller of the rights with regard to the data item or group, each item or group must check its own validity with the server on which it resides. The timing and system of deciding the timing can vary according to level of security and circumstance of the data and the end-user device. The verifications can happen without reference to the end-user of the data and would normally only be brought to their attention should the device be isolated from the network for a period of time that extends longer than the verification time-span. See FIG. 9 If the verification is incomplete or refused, then a validation must take place as described above.

Sending a 'Message' or Publishing an Item or Group to Another Person

All accounts that are assigned to a person would be equipped with a system for messaging between accounts and interfacing with external messaging systems such as e-mail. This would consist of a group within the account group that contains groups that represent incoming items and items that have been delivered to others on the system, sent to people on other systems or are in the process of doing so.

The process of sending an item or group to another person is achieved by adding their name to the list of those able to access the data or group. This data/group item reference would then be published to the other end-user's 'inbox' (or however they wish to describe their new items group) at the time they next connect to the server.

From the viewpoint of the new end-user, to whom the data items/groups have been published they will notice through whatever notification system on the interface that they use that they have new items that they have not yet agreed to receive. Upon opening the group containing new items they will see the items/groups that have been published to their account along with a 'dialog box' telling them who has sent the data to them and offering the opportunity to accept or decline the data. If they accept then the data items/groups become a part of their account and the libraries on their client devices. The data would also be available to be cached to a device should they wish to include it in their device group.

An Overview of a Correctly Configured System

A correctly configured system is dependant upon the owner of the rights associated with the data expressing those rights in accordance with the rights management system in the system outlined here and also in expressing the logical navigation of the data on behalf of those end-users wishing to experience the data. These rules can be described from the following points of view. From the point-of-view of the owner of the intellectual property rights or the controlling entity.

Rights to experience data can be expressed in two ways, by either including their unique account identification number in the security tag system of the data items and groups or by including the unique identification number of a group that contains the unique identification number of the individual along with others. In this case care must be taken in the selection of criteria for membership of the group so that security can be maintained.

In order that new data might be discovered by those end-users seeking it, the items should be both meta-tagged according to both their content and subject and be referenced in groups logical to their successful discovery. It would be logical for the end-user to be able to find groups that are titled with concepts in which they are interested and be able to navigate through a matrix of titles that become ever more specific until the required information is discovered.

From the Point-of-view of the Individual End-user

The individual end-user must also endeavor to create groups and populate them with data that is easy for them to understand and enable them to navigate their systems quickly. This is most logically done by modeling the tasks that they wish to complete using the system outlined here and ensuring that the system is logically predisposed to completing these tasks with the minimum end-user input.

Interrelation Between Server Systems

Figure 13:
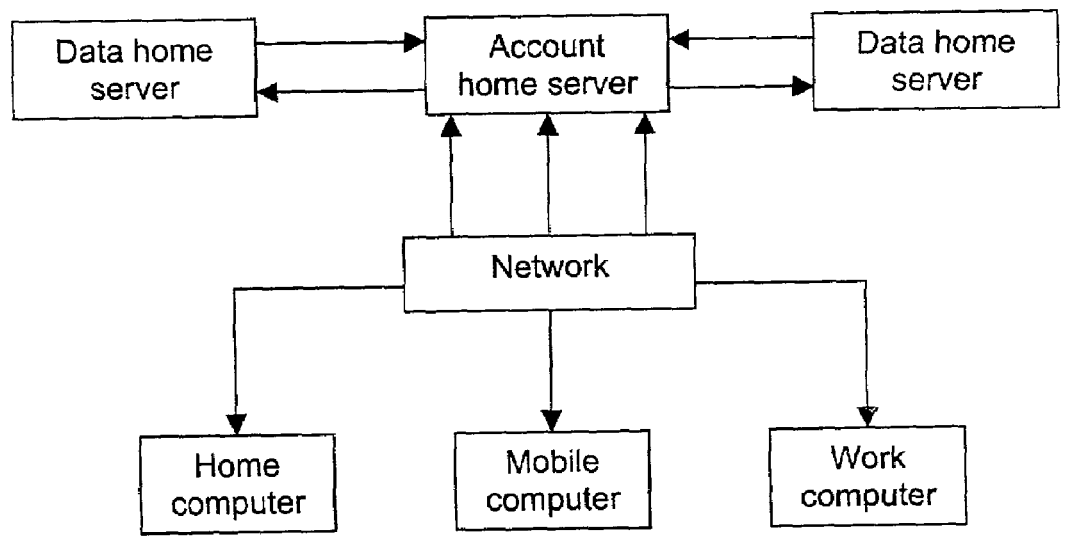
FIG. 13 is a schematic illustration of the input/output properties of a system according to an embodiment of the invention including multiple server programs and client programs.

A server program can also reference data items and groups that are located on other servers that form a part of a network of servers as described here. When items or groups are shared between servers, their unique identification number begins with the unique identification number of the server. In all other cases the procedure for distributing, verifying and validation is identical and is carried out by the server to which it is native; the could be termed the home server and the data native to that server the home server data. Likewise, the data group that represents an end-user account could be termed to be located on the user's home server. See FIG. 13.

Removal of Deprecated Items

It would only be good practice to remove item or group references where the data no longer exists in the source system. Deprecated items (those no longer referenced by any end-user) would normally be removed according to a policy automatically or manually followed by the owner/controller/creator of the data.

It would be good practice to retain deprecated data in compressed form that could be recovered in the event that it is required. In many cases, business information is required by law to be retained for a set period and it would be unwise to delete any deprecated data until that deadline has passed.

Applications of the System

As will be appreciated by the skilled person, the system described provides an underlying architecture for the distribution of data across a computer network. As such, there are few or no bounds to the uses to which it can be put. By way of example, three areas in which it is currently envisaged that the system could be used to great advantage are DRM (digital rights management), data amalgamation and in applications to control work flows, projects and other managed tasks.

In the DRM arena, for example, the system enables the existence of only a single source data entity, e.g. a music track or a video clip, with data items pointing to that entity distributed to allow access by authorised users. Alternatively, where copies of the data entities are cached to either the client or at some other location between the source, these cached copies regularly verify themselves to ensure they remain up to date. In either case, the security, and hence the right owner's control over the data, is inherent to the security tagged data items which provide the links to the data entities (whether the original source or a locally cached copy).

Data amalgamation is another area where the present system can be used to advantage. The data items of the system are independent of the original source of the data and as such can be easily grouped without concerns about incompatible data types. This allows data from disparate sources and of different formats to be re-organized and amalgamated very quickly and efficiently. Moreover, the processes for importing new data into the systems as data items described above can prevent duplication of data.

Management of work flows and the like also becomes straightforward by appropriate grouping of data items. Again, this can be done independently of the specific format of data entity that each item points to. Applying rules to the groups can control the relative timing of actions in the work flow.

Overview of Features and Benefits of Preferred Embodiments

It can be seen from the above description that in preferred embodiments the present invention provides a unique navigation, distribution and storage metaphor for digital data. The system outlined here features a method of grouping items of data into groups of similar items. This means, for example, that 'real world' systems can be modeled within the system outlined here. An example of this would be that parcels could be considered to be equal to items that are placed within a van that could be considered to be a group. In this instance, the items (parcels) within the group (van) would be treated (moved, referenced etc.) together, thus the actual system is duplicated and can behave in a similar way to the computerized system.

A unified, single architecture for the distribution, tracking and securing of digital data across all networks and many devices is provided. The preferred solution outlined here transmits data across networks in a binary format, that being the most elementary transmission system in use at present. It does this because transmission takes place between compiled binary databases on the server and the client application so the transmission is of a format that can be dictated on an individual basis. This system ensures security while data is being transmitted.

Security encoding is carried with each data item and group, interacting with control systems carried with the user device or access point. Thus the item or group can be encoded in a way that allows it to be experienced from any registered device. This combination allows, for instance, media files that are encoded with the information allowing them to be experienced by a specific person can be experienced via any device registered to that person rather than having media coded in a way that allows it to be experienced by anyone through a specific player.

As an architectural product, the system allows tools of certain fixed features and functionalities to be built without reference to security codes or systems.

The system of constructing items as virtual objects to be referenced from within groups as virtual containers means that when the items and groups are constructed from an external source, the items are never constructed twice. If a duplicate or semantically similar piece of data is discovered, the existing item is referenced in the new group, leaving existing references intact. This has the effect of unifying similar data held in similar or dissimilar systems.

The system also allows for the 'stacking' of data items and groups to build an elementary program or application. For instance, a calendar can be built from ordering groups or items on an interface. An address book can be built from people's groups in order, a mail system can be built as described above.

The system also provides a way of deploying content in an appropriate setting in order to be publicized and distributed without having to build a delivery system. For instance, in order to run a virtual news agency, you don't have to build a site.

What is claimed is:

1. A digital data system comprising a server and a client capable of communication with one another over a network, the server including:
    an item store holding a plurality of data items, each data item comprising a pointer to a source data entity accessible from the network, said source data entities being of a variety of different data formats; and
    a component for serving copies of data items to the client; and the client including:
    an item store for holding a copy of one or more of the data items held by the server item store;
    a component for requesting a copy of a data item from the server and placing it in the client item store;
    a component for validating copies of data items held by the client item store and initiating a request for an updated copy of a data item from the server if the copy held by the item store is out of date; and
    a user interface for enabling a user to interact with the data items to access the associated source data entities.

2. A data system according to claim 1, wherein the client comprises a component for verifying a data item at the time it is first copied to the client.

3. A data system according to claim 1, wherein the server comprises:
    a group store holding a plurality of group identifiers, each group identifier having one or more of the data items assigned to it; and
    a component for serving copies of group identifiers to the client; and the client comprises:
    a group store for holding a copy of one or more of the group identifiers held by the server group store;
    a component for requesting a copy of a group identifier from the server and placing it in the client group store; and
    a component for validating copies of group identifiers held by the client group store and initiating a request for an updated copy of a group identifier from the server if the copy held by the group store is out of date.

4. A data system according to claim 1, comprising:
    a data store for holding a copy of one or more source data entities associated with one or more respective data items held by the client item store; and
    a component for accessing over the network the corresponding one or more original source data entities and updating the copy of any data entity held by the client data store if the original has changed.

5. A data system according to claim 4, comprising a component for accessing and updating an original source data entity with changes made to the corresponding copy of the data entity held by the data store.

6. A data system according to claim 4, wherein the data store is held by the client, the copy data entities held in the client data store being those associated with one or more respective data items held by the client item store.

7. A data system according to claim 4, wherein the data store is held at the server.

8. A data system according to claim 1, wherein each data item comprises a security tag indicating the identity of one or more users, and the client comprises a component restricting access to a data item only to those users identified in the data item's security tag.

9. A data system according to claim 8, wherein the client comprises a component that prevents a copy of a data item being placed in the client item store by a user not identified in the data item's security tag.

10. A data system according to claim 8, wherein the client comprises a component for deleting a data item from the client item store and for deleting any associated copy data entity held by the client if the client is accessed by a user not identified in the data item's security tag.

11. A data system according to claim 3, wherein each data group comprises a security tag indicating the identity of one or more users, and the client comprises a component restricting access to a group only to those users identified in the data group's security tag.

12. A data system according to claim 11, wherein the client comprises a component that prevents a copy of a group being placed in the client group store by a user not identified in the data group's security tag.

13. A data system according to claim 11, wherein the client comprises a component for deleting a group from the client group store and for deleting any associated copy data items and data entities held by the client if the client is accessed by a user not identified in the group's security tag.

14. A data system according to claim 1, wherein each data item comprises a meta tag containing information about the source data entity to which it points.

15. A data system according to claim 1, wherein the client is hosted on a wireless communication device.

16. A method comprising the step of utilizing a system according to claim 8 by an owner or controller of digital material to distribute and control access to the digital material.

17. A method comprising the step of utilizing a system according to claim 1 to amalgamate digital data from a variety of disparate sources.

18. A method comprising the step of utilizing a system according to claim 3 to manage a flow of work or a project.

19. A client system for use in a digital data system according to claim 1, the client system comprising:

an item store for holding a copy of one or more of data items held by a server, the client system capable of communication with the server and each data item comprising a pointer to a source data entity accessible by the client, said source data entities being of a variety of different data formats;

a component for requesting a copy of a data item from the server and placing it in the item store;

a component for validating copies of data items held by the client item store and initiating a request for an updated copy of a data item from the server if the copy held by the item store is out of date; and a user interface for enabling a user to interact with the data items to access associated source data entities.

20. A server system for use in a digital data system according to claim 1, the server system comprising:

an item store holding a plurality of data items, each data item comprising a pointer to a source data entity accessible from the network, said source data entities being of a variety of different data formats; and a component for serving copies of data items to a client in response to a request from the client.

* * * * *